United States Patent [19]
Zelna

[11] 3,711,020
[45] Jan. 16, 1973

[54] HIGH FREQUENCY SOLDER PASTE GUN

[76] Inventor: Robert P. Zelna, 4658 East 355 Street, Willoughby, Ohio 44094

[22] Filed: July 6, 1970

[21] Appl. No.: 52,699

Related U.S. Application Data

[63] Continuation-in-part of Ser. No. 848,607, Aug. 8, 1969, abandoned.

[52] U.S. Cl. ........................239/1, 239/4, 239/101, 239/602, 239/DIG. 12, 239/DIG. 19
[51] Int. Cl. .............................................B05b 17/00
[58] Field of Search ........239/DIG. 12, DIG. 19, 456, 239/534, 546, 583, 602, 1, 4, 101, 412; 137/335 R

[56] References Cited

UNITED STATES PATENTS

| 2,969,926 | 1/1961 | Peeps | 239/417.5 X |
| 3,022,955 | 2/1962 | Riddell | 239/391 X |
| 3,306,570 | 2/1967 | Cooksley | 251/335 X |
| 3,069,099 | 12/1962 | Graham | 239/602 X |
| 3,107,705 | 10/1963 | Isserstedt | 222/504 X |
| 3,098,635 | 7/1963 | Delaporte et al. | 251/335 X |
| 3,424,429 | 1/1969 | Monnich | 251/335 X |
| 3,341,124 | 9/1967 | Barnes | 239/412 X |
| 3,224,677 | 12/1965 | Schmidt et al. | 239/4 X |

*Primary Examiner*—Lloyd L. King
*Attorney*—McCoy, Green & Howell

[57] ABSTRACT

An applicator gun for solder paste having a tapered discharge nozzle at the end of the tubular body and having a valve rod mounted to reciprocate in said body so that the tip of the rod engages the internal valve surface of the nozzle. The gun employs a unique combination of a soft elastic rubber nozzle, a soft elastic rubber valve tip, and a special rolling-type rubber diaphragm to minimize secondary displacement of the solder paste. The gun can operate effectively for long periods of time when continually discharging tiny beads of such paste or when operated at extremely high frequency.

1 Claim, 4 Drawing Figures

PATENTED JAN 16 1973

3,711,020

INVENTOR
ROBERT P. ZELNA

BY
McCoy, Greene & Howell
ATTORNEYS

HIGH FREQUENCY SOLDER PASTE GUN

This application is a continuation-in-part of my copending application Ser. No. 848,607, filed Aug. 8, 1969, now abandoned.

The present invention relates to pressure-type applicators for fluent solid or paste-type materials, such as solders and brazes, and more particularly to an applicator gun or solder pastes constructed to operate efficiently at high frequency or when soldering tiny parts.

Heretofore it was not practical to employ conventional solder-paste guns or guns of the type shown in RIddell U.S. Pat. No. 3,022,955 and in my copending application Ser. No. 674, 861 for soldering parts of very small size. Such paste guns would become plugged up or jammed in a very short period of time if used to deposit paste dots of pin-head size as are required for tiny electrical contacts, for example. There was also a problem in obtaining proper feed control so that the gun would provide tiny paste dots of substantially uniform size. For example, the best solder-paste guns heretofore had a tendency toward non-uniform paste feed because of the secondary displacement of the paste by the rubber diaphragm. This was particularly troublesome when attempting to feed tiny dots of paste.

The present invention involves a revolutionary improvement in the operation of solder paste applicator guns which enables them to be used to solder parts of minute size. The applicator gun of this invention can be operated for more than 25,000 cycles without malfunction when used to apply very tiny beads of solder paste, whereas the applicator guns known prior to this invention would probably have plugged up or failed after only 500 to 1000 cycles if they had been used for this purpose.

Prior to the present invention, conventional solder paste guns were usually operated at frequencies no greater than 1000 cycles per hour because of the tendency of the guns to plug up or jam when operated at substantially higher frequencies (for example, 1,500 cycles per hour or greater). The present invention solves this problem by replacing the steel nozzle with an elastic rubber nozzle which permits continuous operation of the gun at frequencies at least two or three times the maximum at which the steel nozzles can be operated satisfactorily. For example, the gun of this invention can be operated satisfactorily for extremely long periods of time at frequencies of 3000 to 4000 cycles per hour or higher.

The applicator gun of this invention incorporates a unique combination of a soft oil-resistant elastic rubber discharge nozzle, a reciprocating valve rod having an elastic rubber tip engageable with the nozzle, and a special rolling-type rubber diaphragm which minimizes secondary displacement of the solder paste by the diaphragm. This combination, when incorporated in a gun of the type shown in my copending application Ser. No. 674,861, provides a reliable applicator gun which delivers tiny paste dots of substantially uniform size continually for long periods of time without the need for frequent replacement of the nozzle and other parts.

An object of the invention is to provide a solder-paste gun which functions efficiently when operated at a frequency of several thousand cycles per hour.

A further object of the invention is to provide suitable means for a mass-production soldering in extremely small parts.

A still further object of the invention is to provide a reliable solder-paste gun which does not become plugged up rapidly when used to apply tiny beads of solder paste.

Another object of the invention is to provide a simple inexpensive solder paste gun which is versatile and which operates effectively for longer periods of time whether used to deliver large or very tiny deposits of solder paste.

Another object of the invention is to provide more uniform application for tiny paste dots by providing the solder-paste gun with a diaphragm which avoids or minimizes secondary displacement of the paste by the diaphragm.

These and other objects, uses and advantages of the invention will become apparent to those skilled in the art from the following drawings, description and claims.

Figure 1:
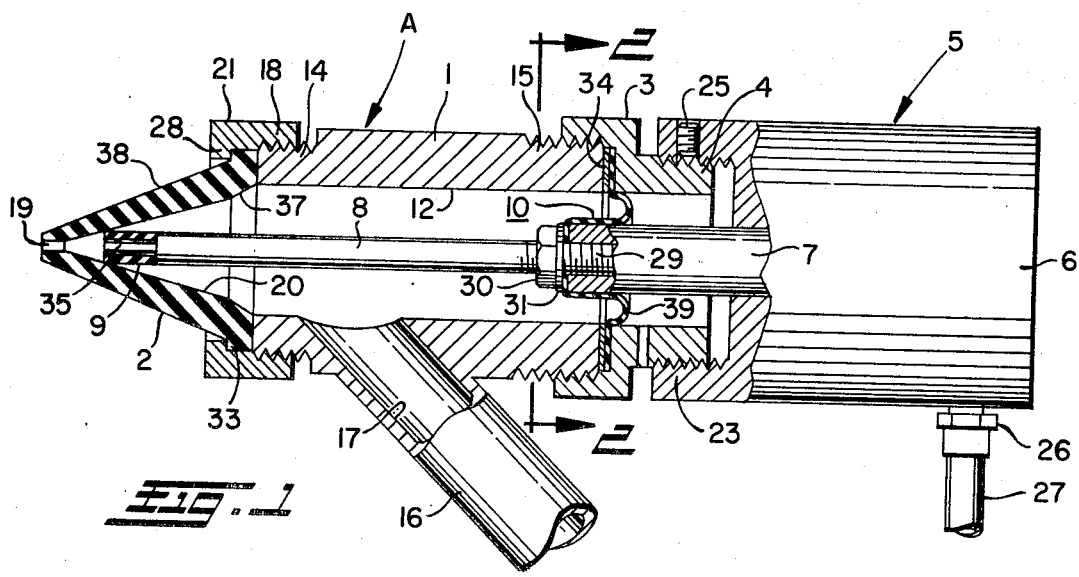
FIG. 1 is a vertical sectional view showing an applicator gun constructed according to the present invention, the parts being shown in their positions at the time of past cut-off.

Referring more particularly to the drawings, which re drawn substantially to scale and in which like parts are identified by the same numerals throughout the several views, there is illustrated an applicator gun A constructed according to this invention having a main body 1, a nozzle 2, a locking ring 3 and a conventional spring-loaded fluid motor 5.

Such motor may be operated by a hydraulic fluid or a gas under pressure and is preferably a reciprocating piston pneumatic motor having a cylinder 6 and a reciprocating piston with a piston rod 7 extending from the cylinder and coaxial therewith. Such piston rod is rigidly connected to a long valve rod or needle valve 8 having a removable cylindrical valve tip 9 that moves into and out of engagement with the nozzle. The plunger 8 has a cylindrical end portion 35 with a reduced diameter equal to or slightly greater than the internal diameter of the tip 9. The tip fits on the portion 35 and is tightly held in position. If desired the surface of portion 35 may be rough to prevent slipping of the tip.

Figure 3:
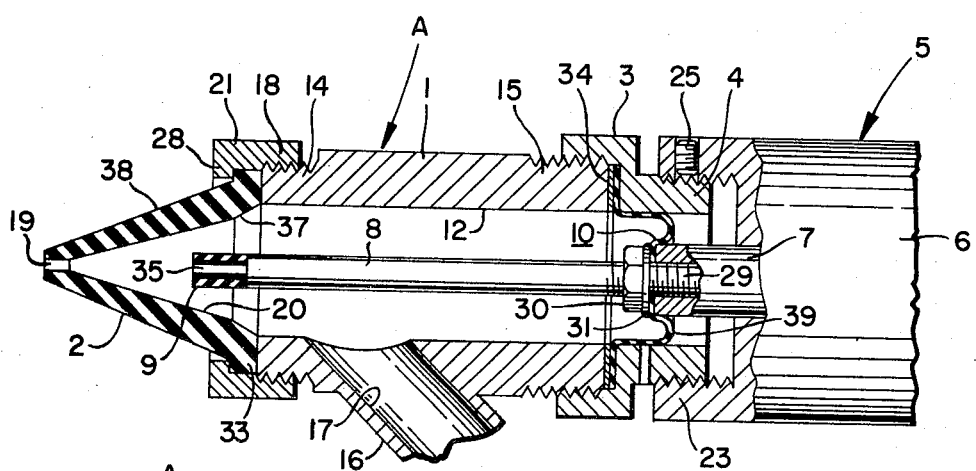
FIG. 3 is a fragmentary sectional view similar to FIG. 1 showing the maximum retracted position of the parts when the motor 5 is adjusted to provide the maximum piston stroke.
Figure 4:
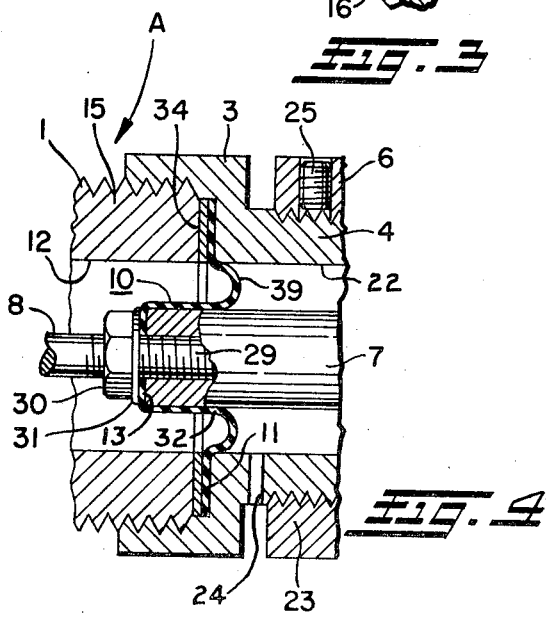
FIG. 4 is a fragmentary sectional view are the solder paste gun on a larger scale showing the parts in their positions as in FIG. 1.

The applicator gun A has a thin-Wall rolling-type diaphragm 10 formed of an elastomeric material, such as rubber or plastic, which may optionally be reinforced with a flexible fabric and which is capable of flexing to permit reciprocation of the needle valve 8. The diaphragm 10 is located at the end of the cylindrical bore or passage 12 of the main body 1 and may have a size and shape substantially as illustrated in FIG. 1, 3 and 4. The walls of the diaphragm may be extremely thin to facilitate rolling during reciprocation of the needle valve.

The main body 1 has an annular threaded portion 14 of reduced diameter at its front end and an annular threaded portion 15 at its opposite end. The body also has an inclined conduit 16 having a cylindrical bore 17 extending therethrough to convey solder paste to the nozzle 2. The nozzle is held in place by a nozzle nut 21 having an annular internally threaded portion 18 screwed onto the body portion 14 and an inwardly directed flange 28 which engages the flange 33 of the nozzle 2.

The locking ring 3 has a generally Z-shaped cross section and is rigidly fixed in the desired adjusted position by a set screw 25 which engages the externally threaded rear end portion 4 of said ring. An optional vent passage 24 may be provided. The internally threaded front end portion of the ring 3 screws onto the externally threaded portion 15 of the main body so that the radially outer portion 11 of the diaphragm 10 is clamped against the annular washer 34 and between said washer and the flat end surface of the portion 4. The latter portion 4 screws into the annular internally threaded portion 23 of the cylinder 6, whereby the fluid motor 5 is rigidly mounted in a fixed position on the rear end of the gun A. Such motor is provided with suitable inlet and outlet connections to effect operation of the motor and reciprocation of the piston rod 7 through a predetermined stroke which may be preselected in any suitable manner. As herein shown, an inlet connection 26 and an air supply line 27 are provided to connect the motor with a suitable source of air under pressure.

The valve rod 8 has a threaded rear end portion 29 which is screwed into the internally threaded end portion of the piston rod 7. As herein shown, a positioning nut 30 and a washer 31 set on the portion 29 and clamp the inner marginal portion 13 of the diaphragm 10 in position on the plunger, said diaphragm having a small circular hole of a size to fit over the portion 29.

The diaphragm 10 is formed of a flexible or elastomeric material and is preferably made from a rubber material which has excellent oil resistance and acid resistance. As the diaphragm 10 is of the rolling type and need not be stretched during use, it may be reinforced with a flexible fabric, such as a fabric used in pneumatic tires.

The solder paste is supplied to the gun in the conventional manner as described, for example, in U.S. Pat. No. 3,022,955. The pressure applied to the paste may be just sufficient to maintain a supply of paste in the bore 8 or may be somewhat greater. The pressure for forcing the paste out of the nozzle 2 is provided by the piston of the motor 5, the plunger 8 acting as a pump piston as described in said U.S. Pat. No. 3,022,955. The air pressure employed in the supply line 27 may vary considerably depending on the type of paste being used, but such pressure is preferably in the range of 4 to 30 pounds per square inch. A double-acting piston may be used, but it is usually preferable to apply pressure to one face only of the piston and to employ a spring to effect movement of the piston in a direction opposing the pressure.

The nozzle 2 and the tip 9 are formed of an elastic oil-resistant synthetic rubber polymer which is soft and readily deformable. For satisfactory operation, such polymer must have a Shore A durometer hardness between about 55 and 90 and preferably between about 60 and about 80. It is preferable to use a soft nitrile rubber such as Buna N, rather than the harder neoprene rubber, but it will be understood that some of the advantages of the invention can be obtained using oil-resistant rubbers other than nitrile rubber and neoprene or by using rubber blends.

In the practice of this invention, best results are obtained when both the internal surface portions of the nozzle 2 and the external surface portions of the valve tip 9 are formed from a soft elastic nitrile rubber consisting essentially of a copolymer of 60 to 75 percent by weight of butadiene and 40 to 25 percent by weight of acrylonitrile. Such rubbers are well known in the rubber art. Suitable nitrile rubbers for use in the present invention include "Butaprene N" rubbers of Firestone Tire & Rubber Company, "Hycar OR" rubbers of B. F. Goodrich Chemical Company, "Chemigum N" rubbers of Goodyear Tire & Rubber Company, "Polysar N" rubbers of Polymer Corporation of Canada, and "Paracril" rubbers of U.S. Rubber Company.

The rubber composition used in making the nozzle 2 and/or the valve tip 9 may be of various types. Generally it should produce a soft elastic rubber with a Shore A hardness as described above, a modulus of elasticity of about 1,000 to about 3,000 pounds per square inch at 300 percent elongation, and a tensile strength of at least 1,000 pounds per square inch and preferably about 1,500 to about 4,000 pounds per square inch.

In practicing the invention it is preferable to form the entire nozzle and the entire valve tip 9 from a nitrile rubber with a Shore A durometer hardness no greater than about 80 and preferably about 60 to about 70. The nitrile rubber composition usually contains a substantial amount of fillers, such as semi-reinforcing (SRF) furnace carbon black, medium processing (MPC) channel black or other carbon blacks, and other conventional compounding ingredients such as vulcanizing agents, antioxidants, accelerators and the like. A typical nitrile rubber composition used to make the nozzle 2 and/or the tip 9 may, for example, contain 100 parts by weight of nitrile rubber, 5 parts of zinc oxide, 50 to 150 parts of SRF or MPC carbon black and a few parts of a suitable curing agent (e.g., 1 to 2 parts of benzothiazyl disulfide).

The diaphragm 10 may be formed of the same type of oil-resistant rubber as used in the nozzle 2. The rubber of the diaphragm is conventional and may be compounded to provide maximum flex life. It is preferably compounded to provide the diaphragm with a maximum useful life.

Figure 2:
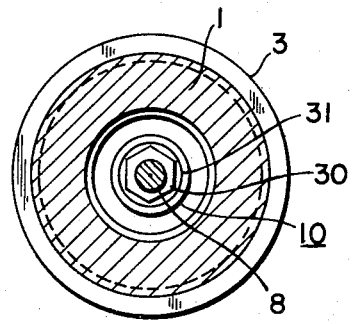
FIG. 2 is a transverse sectional view taken on the line 2—2 of FIG. 1.

The nozzle 2 and the valve tip 9 are drawn substantially to scale in FIG. 1, 2 and 3 to facilitate an understanding of the invention, but it will be understood that the size and shape may vary considerably. The nozzle is preferably tapered and coaxial with the needle valve 8 and has a smooth internal surface 20 which is preferably a surface of revolution. The tapered surface 20 of the nozzle may be spherical or conical and is preferably generally conical. The valve tip 9 is preferably circular or oval in cross section and shaped to engage the internal surface 20 of the nozzle throughout its perimeter to effect paste cutoff. Where the tip engages the internal surface of revolution 20, the line generating such surface is preferably inclined relative to the axis of the needle valve 8, but the angle of inclination is not critical and may vary considerably. Where the surface 20 is conical, the included angle of the cone is preferably about 15° to about 45°, but satisfactory results can be obtained outside this range.

As shown in the drawings, the internal surface 20 is conical and extends from the cylindrical central discharge opening 19 to a short frusto-conical surface 37 located within the radial flange 33 and adjacent to the bore 12. As shown, the rubber nozzle gradually increases in thickness from the discharge end to the flange 33 and has a conical exterior surface 38. It will be understood, however, that the shape of the rubber nozzle may vary considerably.

The rubber valve tip 9 is shaped to provide an outer edge which engages the valve seat or nozzle surface 20 throughout the periphery of the tip. Such tip preferably has a circular cross section and is preferably cylindrical with a relatively sharp circular edge for engaging the surface 20 to effect paste cutoff. The stroke of the piston 7 depends on the size of the paste dots to be applied and is preferably such that the tip 9 does not engage the nozzle surface 20 until the needle valve 8 is at the forward limit of travel. At that time the front circular edge of the tip 9 engages the surface 20 throughout the circumference of said edge to effect paste cutoff. A slight further forward movement of the needle valve, in addition to that necessary to effect such cutoff for the purpose of obtaining a squeegee action or the like, is not necessary, and it is preferred to avoid such squeegee action.

Although the paste cutting action of the valve tip 9 might seem to improve as the hardness of the tip increases, it is best to employ a rubber in the valve tip with a hardness equal to or not substantially greater than that of the nozzle 2. The valve tip should be made of an elastic rubber with a Shore A durometer hardness of no more than 90 and preferably 60 to 80.

The diaphragm 10 is molded generally in the form of a wide-brim hat with a cross section similar to that shown in FIG. 4. The thin-walled intermediate portion 32 of the diaphragm, which extends from the flat outer marginal portion 11 to the flat inner marginal portion 13, has a cross sectional length along its surface which is several times the radial distance from the internal cylindrical surface 22 of the ring 3 to the coaxial external cylindrical surface of the piston rod 7, whereby an axially projecting bulge 39 is formed. The portion 32 flexes and has a rolling-type action at the bulge 39 as the piston rod is advanced and retracted. This minimizes the secondary displacement of solder paste and the pumping action caused by movement of the bulge 39 so that it is possible to obtain substantially uniform deposits of solder paste. The rolling-type diaphragm 10 also has a relatively long useful life as compared to other types of diaphragms.

Prior to this invention it was considered best to employ stainless steel nozzles in solder paste guns of the type disclosed in my application Ser. No. 674,861 and in Riddell U.S. Pat. No. 3,022,955. Generally the life of such a stainless steel nozzle was several hundred thousand cycles. After this, the gun wad disassembled and the nozzle was reamed out or replaced.

The stainless steel nozzles are satisfactory for solder paste dots of normal size when operated at normal frequencies. However, such nozzles tend to jam or plug up rapidly whenever the gun is adjusted for providing paste dots with a size of substantially less than 20 milligrams. For example, tests have shown the stainless steel nozzles will plug up after about 325 cycles when the dot size is around 7 milligrams whereas the rubber nozzle of this invention is still functioning properly after 2,500 cycles when delivering the same size solder paste dots or dots as small as 5 milligrams. Where the dot size is increased to 12 milligrams, the stainless steel nozzle will plug up at around 750 cycles but is still unsatisfactory for commercial production.

The solder paste gun of this invention is especially designed for delivering solder paste dots with a size in the range of 2 to 15 milligrams. Stainless steel nozzles are quite unsuitable for deposit of such tiny paste dots because they become plugged within the very short period of time if used in this way.

Steel nozzles are also unsatisfactory when it is desired to operate at a frequency of several thousand cycles per hour, although such nozzles are sometimes used on solder paste guns operated at a frequency of around 1,000 cycles per hour. The present invention makes it possible to operate continuously at frequencies 100 percent to 200 percent greater than those which are acceptable when using stainless steel nozzles with the same solder paste.

Solder paste guns employing an elastic rubber nozzle in accordance with the present invention having an orifice of 0.032 inch are used in commercial production and operated effectively for extended periods of time at 3,200 to 3,600 cycles per hour. Such guns discharge individual paste deposits with a diameter in the neighborhood of 0.06 inch having a weight of around 0.006 grams. Such guns may be operated with normal paste pressures (for example, around 10 psi). Tests have shown that a stainless steel nozzle of the same size used in the above manner with the same solder paste will plug up or jam after about 100 to 500 cycles. Such steel nozzles are useless for such high frequency work.

It will be understood that, in accordance with the provisions of the patent laws, variations and modifications of the specific methods and devices disclosed herein may be made without departing from the spirit of the invention.

Having disclosed my invention, I claim:

1. A process of delivering solder paste from a solder paste gun having a main body with a central paste-receiving passage, needle valve means for feeding paste from said gun having a deformable tip, a paste-receiving conduit in said main body in communication with said central passage, and means for reciprocating said needle valve means to effect feeding of paste each time the needle valve is reciprocated, said process comprising feeding the paste advanced by said needle valve means through an expansible nozzle having a tapered internal valve seat and a small discharge opening aligned with said central passage to cause expansion of the discharge opening in response to application of pressure thereto, said nozzle being formed of an elastic rubber with a Shore A durometer hardness of about 60 to about 90 that can withstand a tension of at least 1,000 pounds per square inch at 300 percent elongation and permitting operation of the gun for extended periods of time when using said solder paste, which can harden and rapidly plug up such a small discharge opening in a nozzle made of a hard material, causing the tip of said needle valve to engage said valve seat to effect paste cutoff each time the needle valve is reciprocated after delivering a small bead of paste with a weight of about 2 to 15 milligrams, and continually reciprocating said needle valve at a frequency of at least 50 cycles per minute while avoiding secondary displacement of the solder paste and preventing leakage of the paste from the rear of said main body by means of a thin-walled flexible rolling-type diaphragm having an axially bulged intermediate portion with a length to permit a rolling action of the diaphragm.

\* \* \* \* \*